(12) United States Patent
Mendonca et al.

(10) Patent No.: US 9,767,678 B2
(45) Date of Patent: Sep. 19, 2017

(54) SYSTEM AND METHOD FOR PROVIDING CENTRALIZED MANAGEMENT AND DISTRIBUTION OF INFORMATION TO REMOTE USERS

(71) Applicant: United States Postal Service, Washington, DC (US)

(72) Inventors: Pat Mendonca, Damascus, MD (US); Jonathan C. Pruett, Arlington, CA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 15/075,065

(22) Filed: Mar. 18, 2016

(65) Prior Publication Data

US 2016/0275782 A1    Sep. 22, 2016

Related U.S. Application Data (63) Continuation of application No. 14/069,372, filed on Oct. 31, 2013, now Pat. No. 9,293,030.

(51) Int. Cl.
| | |
|---|---|
| *G06F 15/16* | (2006.01) |
| *G08B 27/00* | (2006.01) |
| *G06Q 10/10* | (2012.01) |
| *G06Q 40/04* | (2012.01) |
| *H04L 29/08* | (2006.01) |
| *H04W 4/02* | (2009.01) |

(Continued)

(52) U.S. Cl.
CPC ......... *G08B 27/006* (2013.01); *G06Q 10/107* (2013.01); *G06Q 10/1095* (2013.01); *G06Q 40/04* (2013.01); *G08B 27/00* (2013.01); *H04L 67/025* (2013.01); *H04L 67/34* (2013.01); *H04W 4/02* (2013.01); *H04W 4/22* (2013.01); *H04L 12/58* (2013.01)

(58) Field of Classification Search
CPC .... G08B 27/006; G08B 27/00; G06Q 10/107; G06Q 10/1095; G06Q 40/04; H04L 67/025; H04L 67/34; H04L 12/58; H04W 4/02; H04W 4/22
USPC ........................................................ 709/203
See application file for complete search history.

(56) References Cited

U.S. PATENT DOCUMENTS

| | | | | |
|---|---|---|---|---|
| 6,816,878 B1 * | 11/2004 | Zimmers | ............. | G08B 27/005 340/540 |
| 7,026,925 B2 * | 4/2006 | Roche | .................... | G08B 21/22 340/531 |

(Continued)

*Primary Examiner* — Melvin H Pollack
(74) *Attorney, Agent, or Firm* — Lewis Roca Rothgerber Christie LLP (57) ABSTRACT

The invention includes systems, methods, and software applications for centrally maintaining information and automatically distributing relevant portions of the information to remote users. In one embodiment, a central server stores the information, which is maintained on the central server. Periodically, or each time the server information is updated, the server identifies the portion of the information that is relevant to each user and downloads the relevant portion of information to each user, for example to a mobile device such as a Blackberry™. The invention may be used to maintain and timely distribute information related to emergency response procedures, sales or servicing schedules, and delivery schedules, among other things.

20 Claims, 6 Drawing Sheets

(51) Int. Cl.
*H04W 4/22* (2009.01)
*H04L 12/58* (2006.01)

(56) References Cited

U.S. PATENT DOCUMENTS

| | | | | |
|---|---|---|---|---|
| 7,058,710 B2* | 6/2006 | McCall | ............ | G06Q 30/0613 370/230 |
| 7,085,637 B2* | 8/2006 | Breed | ................ | B60N 2/2863 340/440 |
| 7,133,869 B2* | 11/2006 | Bryan | ................ | H04L 12/1895 |
| 7,148,795 B2* | 12/2006 | Dilbeck | ................ | G06Q 10/06 340/506 |
| 7,149,774 B2* | 12/2006 | Zellner | ................ | G06Q 50/24 379/45 |
| 7,214,065 B2* | 5/2007 | Fitzsimmons, Jr. | ... | G09B 19/00 434/236 |
| 7,337,146 B2* | 2/2008 | Heelan | ................ | G08B 27/005 340/506 |
| 7,509,349 B2* | 3/2009 | Celik | ................ | G06Q 10/10 |
| 7,577,989 B1* | 8/2009 | Bhat | ................ | G08B 25/14 726/16 |
| 7,616,942 B2* | 11/2009 | Karl | ................ | G08B 27/006 340/10.33 |
| 7,647,257 B2* | 1/2010 | Allen | ................ | G06Q 20/10 705/30 |
| 7,664,233 B1* | 2/2010 | Kirchmeier | ............ | G06Q 10/06 379/37 |
| 7,670,263 B2* | 3/2010 | Ellis | ................ | A61B 5/1038 342/357.75 |
| 7,689,721 B2* | 3/2010 | Mousseau | ............ | G06Q 10/107 709/248 |
| 7,714,778 B2* | 5/2010 | Dupray | ................ | G01S 5/0268 342/357.31 |
| 7,778,849 B1* | 8/2010 | Hutton | ................ | G06F 19/322 345/629 |
| 8,060,394 B2* | 11/2011 | Woodings | ............ | G06Q 10/06 705/7.13 |
| 8,073,903 B2* | 12/2011 | Wood | ................ | H04L 12/1895 455/404.1 |
| 8,126,960 B2* | 2/2012 | Obradovich | ...... | H04L 29/12122 709/203 |
| 8,523,571 B1* | 9/2013 | Kissoon | ................ | G06Q 10/00 434/108 |
| 8,666,357 B2* | 3/2014 | Petite | ................ | H04M 11/04 379/39 |
| 8,856,383 B2* | 10/2014 | Beninato | ................ | H04L 29/06 709/224 |
| 9,514,632 B2* | 12/2016 | Hunter | ................ | G08B 25/016 |
| 2004/0107114 A1* | 6/2004 | Curtis | ................ | G06Q 50/184 705/310 |
| 2005/0278187 A1* | 12/2005 | Bobbitt | ................ | G06Q 10/06 705/317 |
| 2009/0019061 A1* | 1/2009 | Scannell, Jr. | ...... | G06F 17/30905 |
| 2013/0070044 A1* | 3/2013 | Naidoo | ................ | H04N 7/14 348/14.02 |
| 2014/0052779 A1* | 2/2014 | Britton | ................ | G06F 19/345 709/203 |

\* cited by examiner

ACCESS RIGHTS
PRIVILEGE & SECURITY MATRIX  400

| User Definition | Access Rights Description |
|---|---|
| All Active Users<br>402 | ▸ View data such as public contact lists and emergency response related information<br>▸ Modify own user profile |
| System Administrator<br>404 | ▸ View, enter, modify, and update any data<br>▸ Add or delete users and their contact information (handheld Blackberry™ address)<br>▸ Push information to a designated group of Blackberries™ |
| Headquarters Administrator<br>406 | ▸ View and modify data related to headquarters<br>▸ Add users, and their contact information (handheld Blackberry™ address)<br>▸ Modify existing users contact information (handheld Blackberry™ address) |
| Area Administrator<br>408 | ▸ View and modify data related to their area<br>▸ Add users, and their contact information (handheld Blackberry™ address)<br>▸ Modify existing users contact information (handheld Blackberry™ address) |
| Organization Administrator<br>410 | ▸ View and modify data related to their organization<br>▸ View and modify users' levels of access<br>▸ Add users and their contact information (handheld Blackberry™ address) |

SYSTEM AND METHOD FOR PROVIDING CENTRALIZED MANAGEMENT AND DISTRIBUTION OF INFORMATION TO REMOTE USERS

CROSS-REFERENCE TO RELATED APPLICATIONS

The present application is a continuation of U.S. patent application Ser. No. 14/069,372, filed on Oct. 31, 2013, now U.S. Pat. No. 9,293,030, which is a continuation of U.S. patent application Ser. No. 10/953,449, filed on Sep. 30, 2004, now U.S. Pat. No. 8,601,049, which claims the priority to and the benefit of U.S. Provisional Application No. 60/549,528, filed Mar. 4, 2004, the disclosures of which are incorporated herein by reference.

BACKGROUND OF THE INVENTION

Field of the Invention

This invention relates generally to centralized management and distribution of an organization's information, and, in particular, information regarding emergency response plans, procedures, and contact information, delivery information, and customer service information.

Description of the Related Art

Today, businesses and other organizations strive to improve their preparedness for the unexpected. Organizations recognize the importance of continuing their business operations, communicating with personnel, and maintaining the safety of personnel during times of crisis. To do so, businesses and other organizations typically design and maintain a set of rules and procedures to follow in case of an emergency, such as a fire, earthquake, terrorist attack, or other disaster. In the event a disaster strikes, companies, organizations, and institutions expect their personnel to follow the organization's emergency response procedures.

Effective emergency response procedures must be updated periodically. To facilitate personnel's awareness of the updated emergency response procedures and to ensure that all required measures are followed accurately, an organization typically collects and organizes pertinent information for the entire organization and distributes it to a selected group of individuals. Conventionally, emergency response procedures, tracking and reporting information, contact lists, and other information related to emergency response are organized, printed, and compiled in a loose-leaf, paper-based binder or other type of hard-copy manual, and the organization distributes the three-ring binders, and any periodically updated portions, to the personnel responsible for following and implementing the emergency response procedures.

To implement such a system, a number of employees in an organization have to spend time creating, updating, compiling, and distributing manuals and their updated portions to the relevant employees within the organization. Distribution may be especially difficult if the relevant employee is located offsite in a remote office, if the employee travels frequently or for extended periods, or if the employee's job requires being out of the office or away from their desk, such as delivery or sales job that requires visiting customer sites or help desk personnel that visit the offices of IT system users to fix their computer problems. By the time the emergency-response-related information is entered, organized, compiled and distributed, some of the information may be outdated or obsolete.

In addition, the employees responsible for following and implementing the emergency response procedures have to spend time on a regular basis checking to ensure that their binders or manuals contain the most up-to-date versions of documents, contact lists, etc. The relevant employees may neglect to timely update the information that pertains to them, especially if they are busy, travel frequently, or spend little time in an office. This conventional process of collecting and disseminating information is time consuming, costly, and incapable of providing the most up-to-date information on a timely basis. It is therefore desirable to provide an automated system capable of delivering in a timely manner the most current and accurate information, such as emergency response information, directly to the individuals responsible for using the information, such as the employees responsible for following and implementing an organization's emergency response procedures.

Similarly, timely delivery of up-to-date information maintained at a central location is desirable for other aspects of an organization's operations as well. For example, the schedules and tasks for personnel that travel to customer locations, such as service persons, repair persons, or delivery persons, may be created and maintained at a central location, such as a call center. Distributing and maintaining daily printed travel schedules to such personnel suffer the same drawbacks described above for emergency response procedures, perhaps even more so because these travel schedules and tasks can change frequently and with no notice, as customers call in with new requests, cancel previous requests, change the desired visit time of previous requests, request new tasks or services to be performed, or change the particulars of a task or location. Thus, it is desirable to provide a system capable of centrally maintaining yet timely delivering the most up-to-date and accurate scheduling, tasking, and other information to the personnel responsible for implementing the scheduled activities.

SUMMARY OF THE PRESENTLY CLAIMED INVENTION

Embodiments of systems, methods, and software applications consistent with the invention collect and update information, such as emergency response information, in a centralized location and automatically distribute at least a portion of the information to relevant individuals via storage-capable wireless devices, such as a BlackBerry™ handheld device. In one embodiment, the centralized location includes a networked server and network site containing information needed by the offsite individuals. The information on the server is kept up-to-date by staff at the centralized location or through the network. The server sends the latest information pertaining to each individual to that individual's wireless device soon after the information is updated at the central location, and the wireless device stores the information so that the individual can access it on demand.

In accordance with the invention, a system for providing centralized management and distribution of information comprises a central data processing apparatus for maintaining a set of information for an organization and for dividing the set of information into a plurality of subsets of information based on relevance to each of a plurality of users; a network, communicatively connected to the central data processing apparatus, for communicating each subset of information to the user to which the subset is relevant; and a user device, communicatively connected to the network, for receiving, storing, and presenting the subset of information relevant to a user of the user device.

In accordance with another aspect of the invention, a method, system, and software product for providing centralized management and distribution of information, comprises the operations of storing information regarding an organization in a central apparatus; accepting an update to the information; determining a portion of the information that is relevant to a user; communicating the portion of the information to a device associated with the user; and storing the portion of the information on the device.

In accordance with yet another aspect of the invention, a system for providing centralized management and distribution of emergency response procedures, comprises a server containing the emergency response procedures; at least one wireless device for receiving and storing information; and a wireless communication network for connecting the wireless device and the server, wherein the server sends a portion of the emergency response procedures to the wireless device when the emergency response procedures are updated; and the wireless device receives and stores the portion of the emergency response procedures.

In accordance with yet another aspect of the invention, a system for providing centralized management and distribution of item delivery information, comprises a server containing the item delivery information; at least one wireless device for receiving and storing information; and a wireless communication network for connecting the wireless device and the server, wherein the server sends a portion of the item delivery information to the wireless device when the item delivery information is updated; and the wireless device receives and stores the portion of the item delivery information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

An organization, such as a company, business, partnership, business division, department, or section, may maintain all of its emergency-response-related information in one database, for example, as an Electronic Continuity of Operations Plan (eCOOP). Such a database may reside in a memory device, such as a semiconductor storage device, magnetic storage device, or optical storage device, among others, on a main central server supported, for example, by Oracle PL/SQL database application. The system may include a redundant backup server at a separate location, mirroring the information on the primary server and available to perform its functions if needed.

The eCOOP may contain emergency response information, for example, procedures, instructions, tasks, contact lists, emergency planning information, and other emergency-response-related documentation. The eCOOP may also contain a list of the employees authorized by an organization to receive emergency-response-related information.

Figure 1:
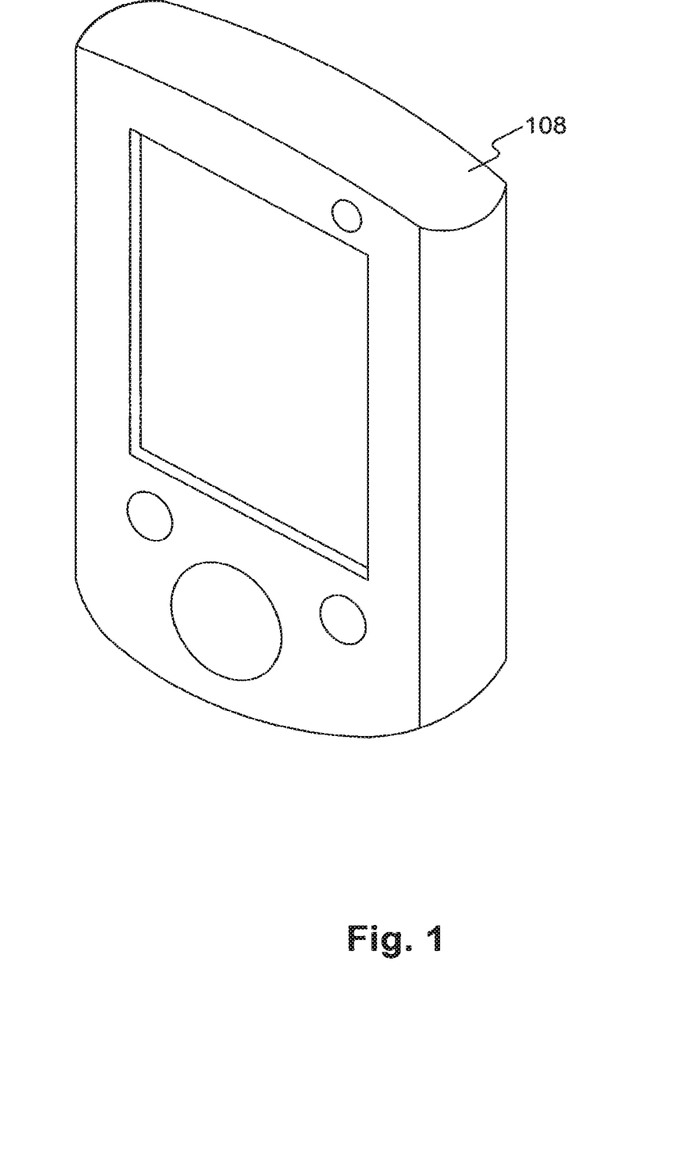
FIG. 1 is an exemplary generic wireless mobile device.

To enable an organization's employees to remotely receive downloaded emergency-response-related information from the eCOOP server, an organization may provide each designated employee with a mobile device having wireless access to e-mail or other wireless or remote data-download capability, for example, a BlackBerry™ device. FIG. 1 depicts an exemplary generic mobile handheld device, such as a BlackBerry™ 108. Each such BlackBerry™ 108 may be wirelessly connected to a server where the eCOOP resides. Using his or her BlackBerry™ 108, an employee may remotely receive emergency-response-related information directly from the eCOOP via e-mail or other data-download technique. Other wireless mobile devices, such as a laptop PC with a wireless card or a Palm Pilot™, among others, may be used.

Figure 2:
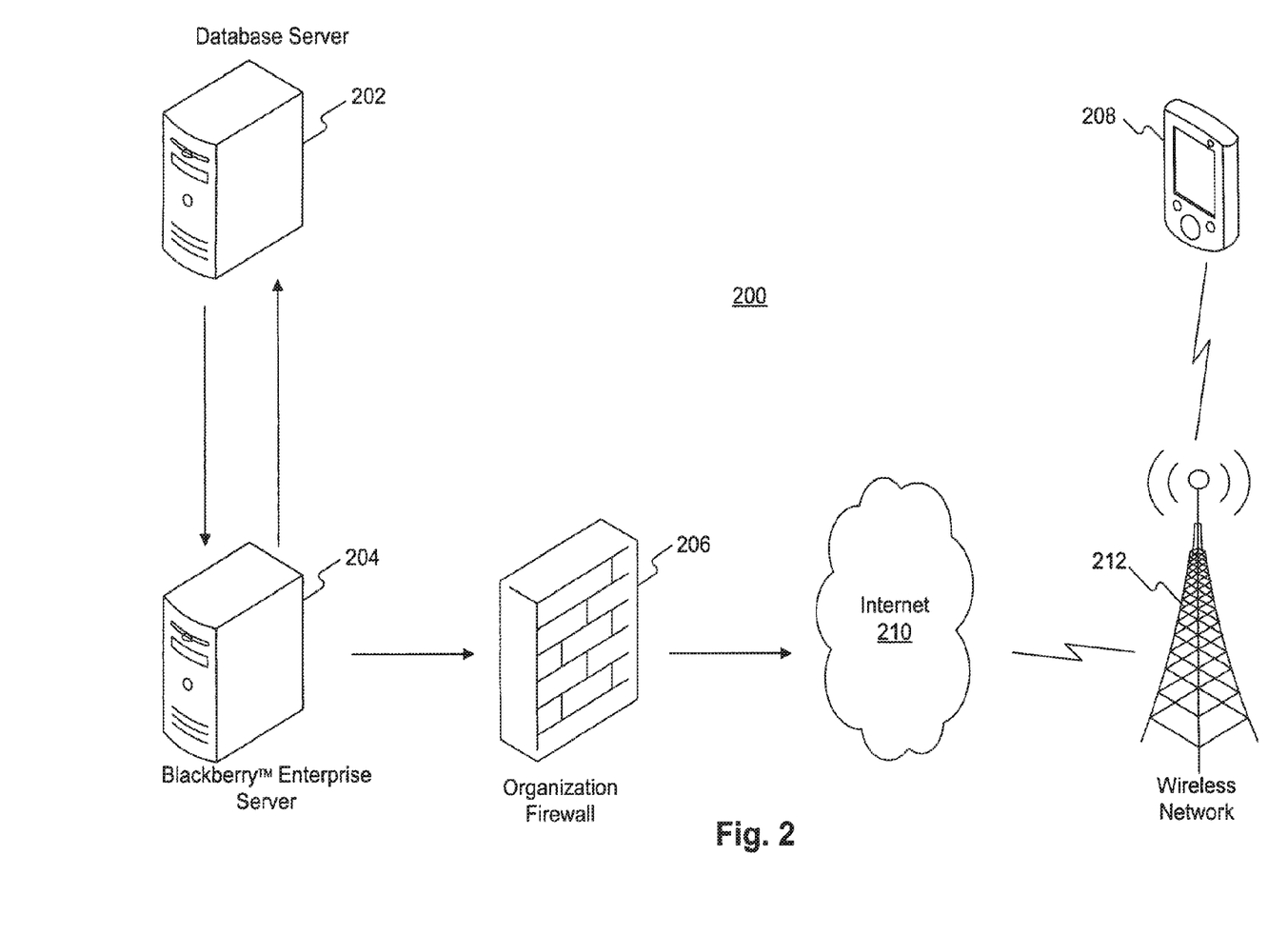
FIG. 2 depicts an exemplary system that connects a database server and a mobile device having wireless access.

FIG. 2 depicts an exemplary system 200 that connects a database server 202 and a mobile device 208 having wireless access to e-mail or other download techniques, which are well known in the art. In the embodiment shown, database server 202 may send a new or updated set of information, such as emergency-response-related information from an eCOOP, to a network server, such as a BlackBerry Enterprise Server (BES) 204. In the embodiment illustrated, once the network server 204 receives new or updated information from the database server 202, it forwards this information to each individual mobile device 208 via the organization's firewall 206, a network (such as the internet 210), and a wireless network 212.

In one embodiment consistent with the invention, the database server 202 determines the portion of the organizational information that pertains to each user of a mobile device 208, and sends just that portion of the information to the device 208 of each user. Thus, a user's mobile device 208 receives only the information relevant to that user. In the eCOOP example, a user's mobile device 208 may receive and store emergency response checklists for that particular user to implement, contact lists for employees that report to that user and whom the user must call in case of an emergency, or the address of an alternate work or meeting site that the user should report to in case of a disaster. Server 202 may make this determination using a software application that considers, among other things, the user's title within the organization (e.g., department manager), the user's designation within the system framework (e.g., regional emergency response coordinator), the user's primary work site, an access control list, or other information regarding the user maintained in server 202.

Although several of the described embodiments of the invention utilize a database to store information, those of ordinary skill in the art will recognize that organizing the information in a database is not critical to the invention. The information may be stored in any way that allows it to be accessed, modified, and sent out to users, without departing from the principles of the invention. For example, the information may be contained in a word processor file that may be the basis for a hardcopy manual, such as an emergency response procedures manual, or it may be contained in a calendar file, such as Lotus Notes™ file.

Further, although many embodiments are described in the context of emergency response information, one of ordinary skill will recognize that the invention encompasses other applications such as outside service or sales call applications, inside service call applications (help desk), or item delivery applications. Many organizations may employ one or more of these and other applications, such as, for example, the United States Postal Services (USPS), Federal Express, United Parcel Service, and other delivery businesses.

Figure 3:
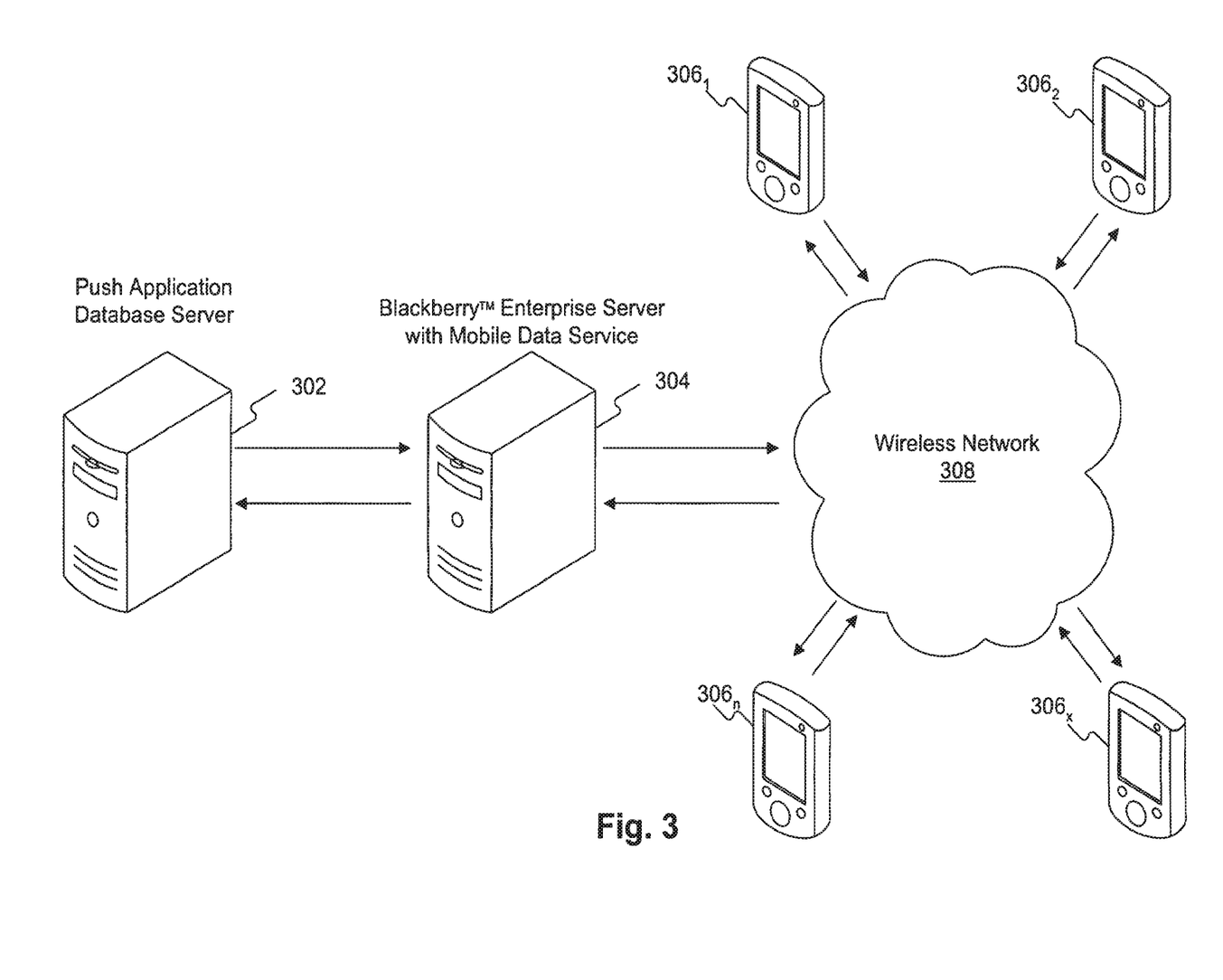
FIG. 3 depicts another exemplary system connecting a database server with mobile devices.

FIG. 3 depicts an exemplary system connecting a database server 302 with mobile devices 306. In the embodiment shown, an organization may use a software application, such as a "push" application, to forward, for example via e-mail, new or updated information, such as emergency-response-related information in an eCOOP system, to designated mobile devices. In one embodiment, the push is done automatically, without a specific request from the mobile device user.

More specifically, when a new or updated set of information, such as eCOOP emergency-response-related information, is ready for forwarding to the mobile devices 306.sub.1 through 306.sub.x, the push application server 302 sends a request to a software application residing on a mobile device server, such as the Mobile Data Service feature of the Blackberry™ Enterprise Server (BES) 304, which were developed by the Research In Motion Ltd. Company. In response, the Mobile Data Service acknowledges that it received the request, converts the contents of the request, and passes it to BES 304. BES 304 compresses, encrypts, and forwards the converted contents of the request to the appropriate mobile devices among 306.sub.1 through 306.sub.x. As shown, each mobile device 306.sub.1 through 306.sub.x, such as a handheld BlackBerry™ device, receives the compressed and encrypted contents of the request via a wireless network 308. Once the pushed information is received, each mobile device 306 may send an acknowledgement of receipt to the Mobile Data Service.

In one embodiment consistent with the invention, an organization may use the push application to download a new or updated set of emergency-response-related information to its personnel's mobile devices 306 every time new or updated information is entered into the database on server 302. In another embodiment, an organization may push emergency-response-related information to mobile devices 306.sub.1 through 306.sub.x on a regular basis, for example, every seven days, regardless of whether or not new information was entered into the database on server 302. Once a mobile device 306 receives information, such as eCOOP emergency-response-related information, it may locally store such information indefinitely or until overwritten by a subsequent download of updated information. Thus, personnel with a mobile device 306 have continuous access to up-to-date information even if the connection between the mobile device 306 and the wireless network 308 is disrupted, the servers 302 or 304 malfunction, or the connection between server 304 and the network 308 is disrupted. Periodically pushing information, such as emergency-response-related information, into mobile devices 306, helps ensure that all personnel responsible for implementing or acting on the information, such as performing emergency response procedures, automatically and consistently receive up-to-date and accurate information that is relevant to them.

Figure 4:
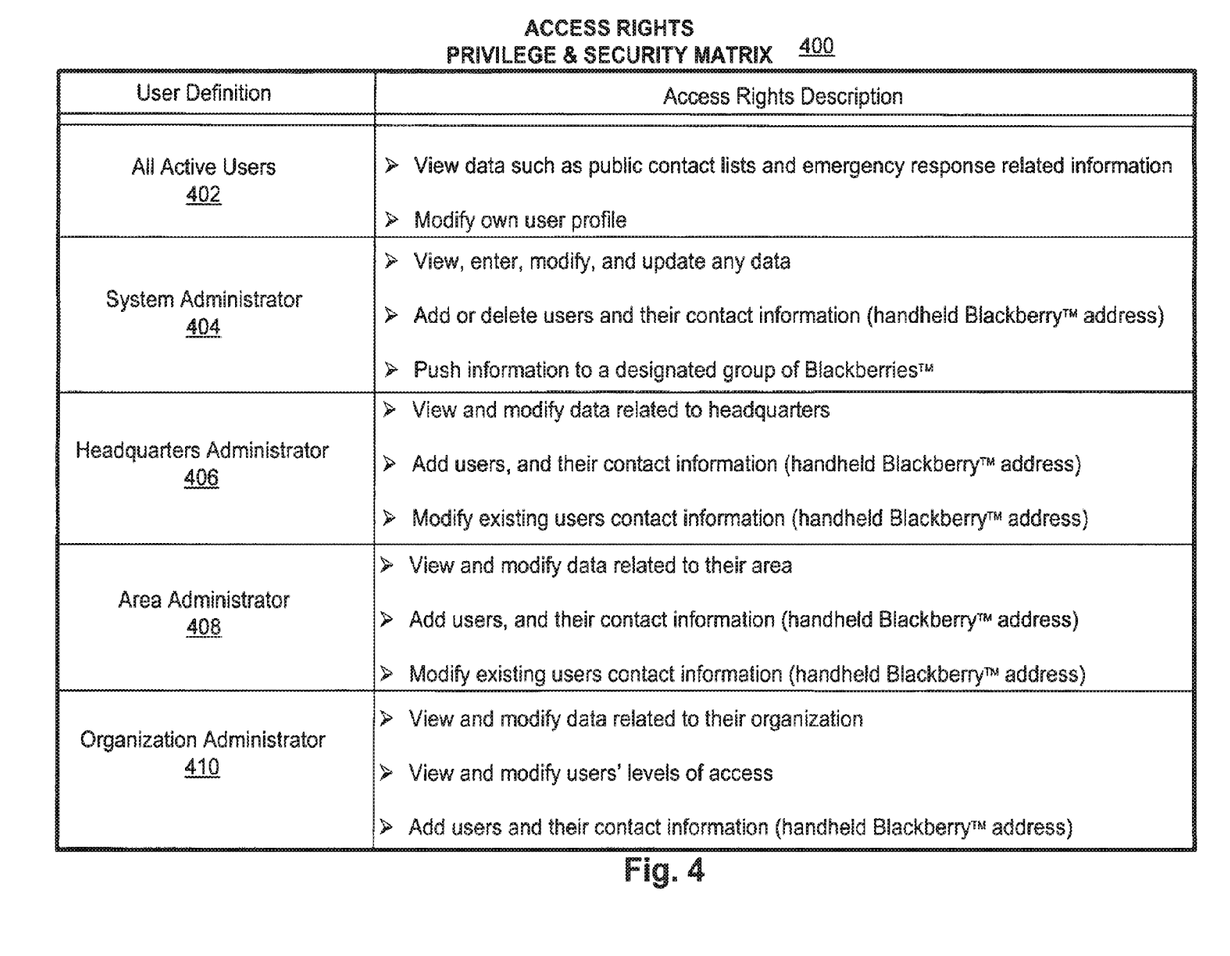
FIG. 4 is an exemplary Access Rights Privilege and Security Matrix identifying groups of access rights for different groups of the employees.

FIG. 4 is an exemplary Access Rights Privilege and Security Matrix 400 identifying groups of access rights for different groups of employees. To control access to a central database of organization-wide information that needs to be disseminated to certain employees, and maintain its security, an organization may assign certain access privileges to designated employees, for example, rights to view, enter, update, and modify the contents of an eCOOP information database, or a delivery information database, or a service call information database. In one embodiment, an organization may have a tier system identifying different combinations of access rights for different groups of employees within an organization. For example, as shown in row 402, an organization may grant all employees designated as active users of the system a right to view the information related to all users in general, such as the complete set of emergency response procedures stored in an eCOOP database. In one embodiment, active users may also have a right to download such information on demand. In another embodiment, an organization may restrict the viewing and downloading privileges of certain groups of its employees, effectively blocking certain areas of the database from access by specified groups of employees. For example, in an eCOOP-type embodiment, an organization may block from viewing and downloading a portion of the contact list for all the users located outside of the geographical area related to that portion of the list.

In one embodiment consistent with the invention, users have write access to portions of the information in the main central database. For example, as shown in row 402, an organization may allow all the users of the system to change their own user profile, including information such as contact information, name, phone number, and address of their BlackBerry™, laptop computer, home computer, or other device that may receive and store information for them. In another embodiment, an organization may prevent certain users from modifying their own information, or have users submit a change request to the personnel maintaining the central database, who then make the requested changes to the database.

As shown in row 404, system administrators may have the right to view, enter, delete, modify, and update any data contained in the information database. That right may include the right to add or delete users of the system and their contact information, such as their BlackBerry™ or other mobile device address.

As shown in row 406, headquarters administrators may have a right to view and modify data related to the headquarters. They also may have a right to add users and their contact information. An organization may also grant headquarters administrators a right to modify contact information of the existing users.

As shown in row 408, area administrators may have a privilege to view and modify data related to their area contained in the information database. That privilege may include the right to add users of the system and their information distribution contact information, such as their BlackBerry™ address or home computer address. Area administrators may also have a right to modify contact information of the existing users of the system.

As shown in row 410, organization administrators may have a right to view and modify data related to the organization. They also may have a right to view and modify a user's level of access and add new users and their contact information. In one embodiment consistent with the invention, additional levels of administrators with different combinations of access rights may be added by the organization. For example, an organization may designate department administrators as having rights to view, modify, and add information for new users from their department.

In one embodiment consistent with the invention, to enhance the information content and usefulness for each user, an organization may offer users the option of customizing their own user information and presentation in the central server database, so that it appears among the organization's information. For example, in an emergency response system embodiment such as eCOOP, a user may add a task of picking up children at school to the emergency response task list maintained in the eCOOP database; or the user may be allowed to modify their local copy of the task list that was downloaded to their mobile device or home computer. As another example, a user may add names and contact information of friends and relatives to the contact list maintained as part of the eCOOP information.

One skilled in the art will recognize that many alternative embodiments of the scheme shown in FIG. 4 are possible within the scope of the invention. For example, an organization may restrict the information that certain groups of users may view and download. As another example, an organization may limit access for certain groups of users to various partitioned areas of the information database, such as an eCOOP database.

Figure 5:
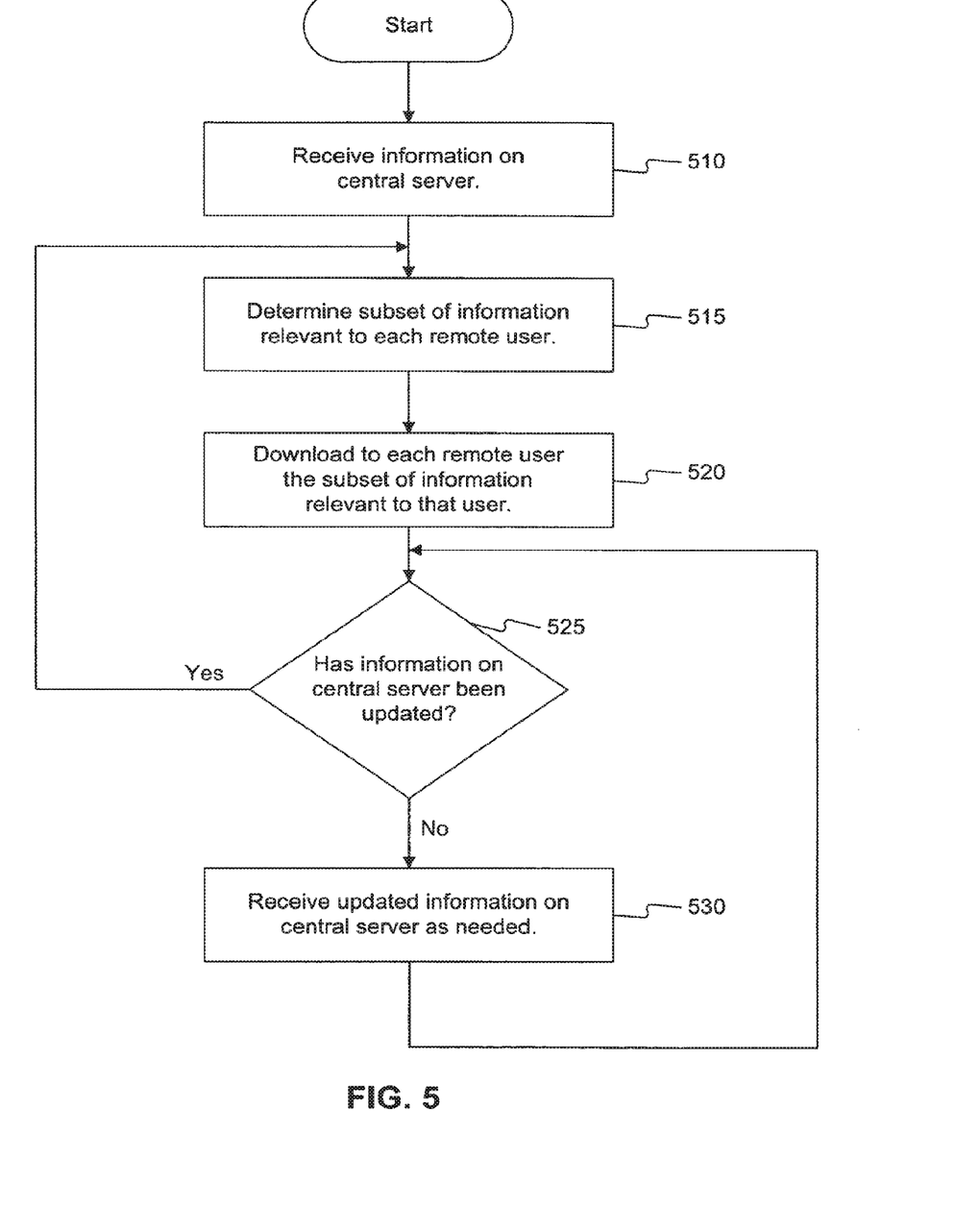
FIG. 5 is a flowchart of an exemplary process consistent with the present invention.

FIG. 5 is a flowchart of an exemplary process consistent with the present invention. Such a process may be implemented as a software application(s) running on conventional data processing system, such as a central server, on a hardwired system, or as a combination of the two. In the embodiment shown, the process begins by receiving information on a central server (step 510). The information may pertain to any of several categories, such as emergency-response-related information, continuation-of-operation-plan-related information, delivery-schedule-related information, customer-service-call-related information, sales-call-related information, help-desk-request-related information or other centrally maintained information that needs to be provided to remote users in a timely manner. The system implementing the process may receive information manually from personnel that maintain the information or automatically from other systems that maintain or contribute to the information. The exact manner in which the information is received and maintained is not critical to the invention. The information may be stored as a database, spreadsheet, word processing file, organized data collection, or some other data-storing entity. The exact data-storing entity is not critical to the invention.

Next, the process determines a subset of information that is relevant to each remote user (step 515). For example, in the case of continuation-of-operations plan information, if the remote user is the manager of a department, the subset of information may include the emergency response procedures for the department, a contact list for the department employees who report to the manager, and an alternative work site where the department would meet and organize in case of an emergency. It would not include information from other departments other than the one that the user manages. As another example, in the case of customer service call information, if the remote user is a service technician the subset of information may include a schedule of appointments for the day for the remote user, addresses of each customer to be visited by the remote user, a description of the service to be performed for each customer, and driving directions from one customer location to the next. Similar subsets of information may be relevant to an inside service person, such as help desk personnel. As yet another example, in the case of delivery information, if the remote user is a delivery person, the subset of information may include a schedule of deliveries for the day for the remote user, addresses of each delivery, a description of the item to be delivered to each customer, and driving directions from one delivery location to the next.

The process then downloads to remote users (preferably, each remote user) the subset of information relevant to that user (step 520). This may be accomplished by downloading to a mobile device associated with the user, such as a Blackberry™, Palm Pilot™, cellular telephone, laptop computer with a wireless network card, laptop computer connected to a designated website, specialized receiving system in a delivery vehicle, satellite radio, GPS device, or other mobile device associated with the user that is capable of receiving and storing data.

In step 525, the process determines whether the information on the central server has been updated. The information may be updated by personnel or systems dedicated to maintaining the information so that it remains accurate and up-to-date. The information may be updated for many reasons. For example, in the case of continuation-of-operation-plan information, the information may be updated if emergency response procedures change, if the personnel involved with the emergency response procedures change, if the personnel contact information changes, or other reasons. As another example, in the case of customer service call information including both outside customer services, such as telephone repair, and inside customer services, such as an IT help desk, the information may be updated if a new trouble ticket comes in, a customer calls and cancels a service call, if a new service call is added, if a customer availability time changes, if another service person phones in sick and their calls for the day must be reassigned, or other reasons. As yet another example, in the case of delivery information, the information may be updated if a delivery address changes, if a new delivery is added to the schedule, if an item does not arrive from a prior location in time to be delivered as scheduled, if another delivery person calls in sick, if additional delivery persons become available to assist with the day's deliveries, or for other reasons.

If the information on the central server has been updated (step 525, Yes), then the process returns to steps 515 and 520 to determine a subset of information for each user from the updated information, and download the relevant updated subset to each user. If, on the other hand, the information on the central server has not been updated (step 525, No), then the process loops to receive updated information on the central server as needed (step 530). As noted above, there are numerous reasons that may cause the central server information to be updated.

One of ordinary skill will recognize that steps may be added to, deleted from, or modified in the process depicted in FIG. 5 without departing from the principles of the invention. For example, steps could be added to check whether the updated information received in step 530 came from a person authorized to update the information, and if not, to reject the information and prevent it from being downloaded to remote users.

Figure 6:
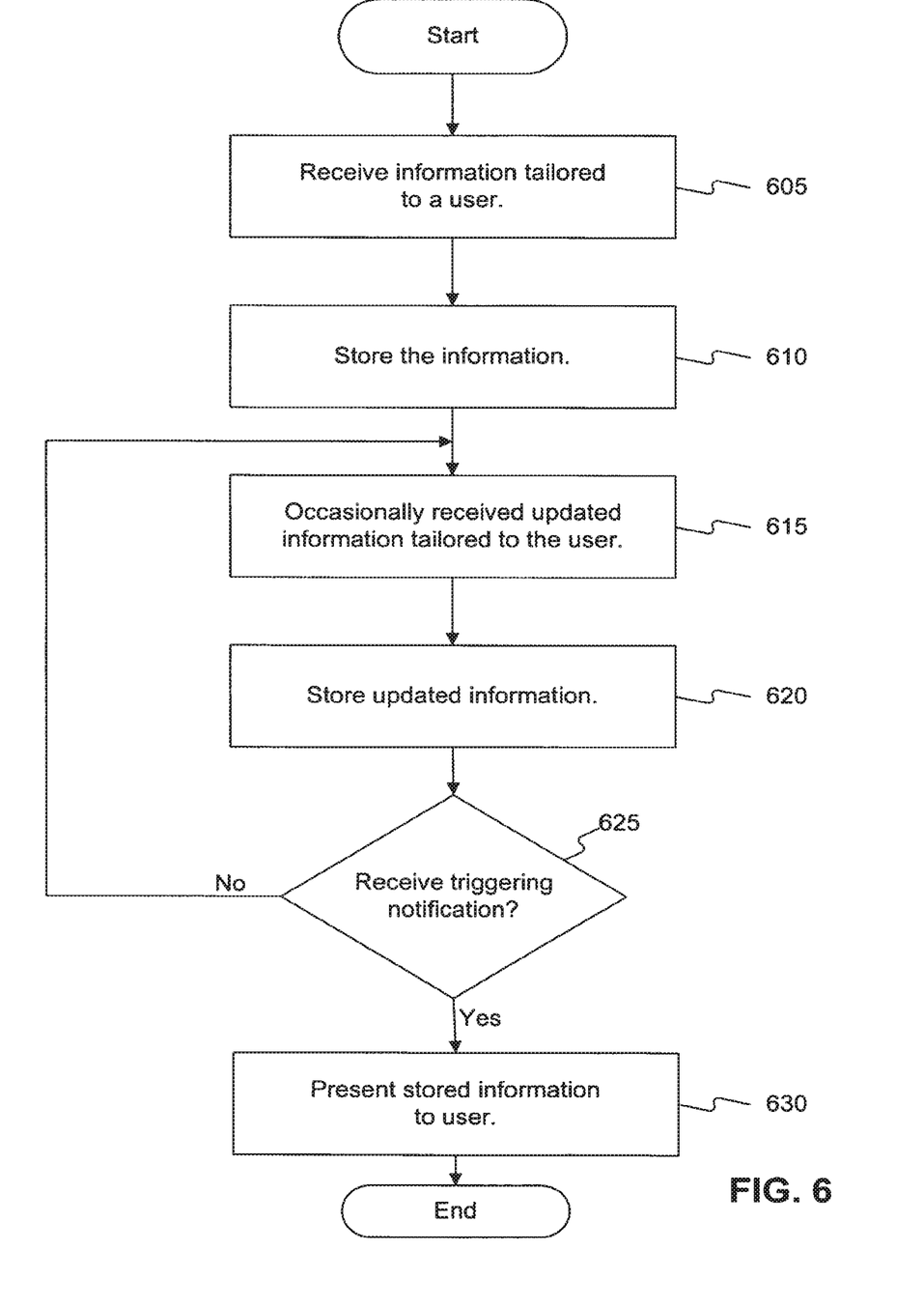
FIG. 6 is a flowchart of another exemplary process consistent with the present invention.

FIG. 6 is a flowchart of an exemplary process consistent with the present invention. Such a process may be implemented as a software application(s) running on a conventional mobile data processing device, such as a Blackberry™ or laptop computer, as a dedicated hardwired mobile device, or as a combination of the two. In the embodiment shown, the process first receives information tailored to a user (step 604), such as the subset of information determined in step 515 of FIG. 5. In the embodiment shown, the received information is tailored such that it consists largely or wholly of information relevant to the user from among a greater set of information that is relevant to several users or an entire organization. For example, if the user is a delivery person, the information may include only the delivery schedule that must be run by that delivery person, and exclude information concerning the delivery schedules of other delivery persons in the same organization. In another example, if the user is a department employee, the information may include the specific emergency response procedures to be followed by that employee in case of a disaster, excluding the emergency response procedures of other departments and other employees. In another embodiment consistent with the invention, the received information is not narrowly tailored to the user and contains information beyond the minimum that the user needs to know.

Next, the system running the process stores the information (step 610). In one embodiment, the stored information is retrievable on demand by the user. For example, if the receiving device is a Blackberry™, it may run a custom software application that stores the received information and allows the user to access it by selecting an icon associated with the application on the Blackberry's touch screen.

Next, the process may occasionally receive updated information tailored to the user of the receiving device (step 615). As noted above with respect to FIG. 5, the information may be updated and sent to the user for many different reasons independent of the user and without the user's knowledge or input.

The next step of the process stores the updated information (step 620). In one embodiment, the stored updated information is retrievable on demand by the user.

In the embodiment shown, the process then determines whether it has received a triggering notification (step 625). For example, in the context of a continuation-of-operations plan system, the triggering notification may be an email, phone call, fax, or other communication of the occurrence of a disaster that requires implementation of emergency response procedures. In another example, in the context of a delivery or service call system, whether inside or outside, the triggering notification may be an email, phone call, fax, or other communication of the occurrence of a change in delivery or service schedule. In yet another example, in the context of an inside service call system, the triggering notification may be an email, phone call, fax, or other communication of the occurrence of a new problem being experienced by a user of an organizations IT system.

If the process has not received a triggering notification (step 625, No), then it continues to receive and store updated information for the user. If the process has received a triggering notification (step 625, Yes), then it presents the stored information to the user (step 630). For example, a mobile device receiving the notification may generate an audible signal or vibrate and display the stored information on its screen after receiving a triggering notification, or it may use voice synthesis to present the information orally to the user.

One of ordinary skill will recognize that steps may be added to, deleted from, or modified in the process depicted in FIG. 6 without departing from the principles of the invention. For example, in the case of an eCOOP system, steps could be added to automatically contact, for example via email from a mobile device, persons on an emergency response contact list when a triggering notification is received. For another example, step 630 could be deleted, so that the user would have to manually access the stored information after receiving a triggering notification.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, comprising:
   accessing, by a processor, emergency response data concerning an organization, the emergency response data comprising contact list data associated with a first person associated with the organization, work site location data associated with the first person, work site location data associated with a second person associated with the organization, and contact data associated with the second person;
   receiving, by the processor from a second computing device over a communications network, a triggering notification indicating the occurrence of an emergency event at an emergency location;
   determining, by the processor based on the emergency response data, that the work site location associated with the first person is within a predetermined geographical area that includes the emergency location;
   assigning, by the processor, the second person as an emergency contact associated with the first person based on the work site location data associated with the second person; and
   transmitting, by the processor over the communications network to one or more communication devices associated with one or more persons identified in the contact list data associated with the first person, an electronic communication indicating the occurrence of the emergency event, the electronic communication identifying the emergency location and the second person assigned as the emergency contact and comprising the contact data associated with the second person.

2. The computer-implemented method of claim 1, further comprising transmitting, by the processor, the electronic communication over the communications network to a communication device associated with the first person.

3. The computer-implemented method of claim 1, further comprising transmitting, by the processor, the electronic communication over the communications network to a communication device associated with the second person.

4. The computer-implemented method of claim 1, wherein the emergency response data further comprises alternative work site data identifying a location to which the first person is assigned to travel in response to the occurrence of the emergency event.

5. The computer-implemented method of claim 4, wherein the electronic communication further comprises the alternative work site data.

6. The computer-implemented method of claim 1, wherein the emergency response data further comprises organization title data associated with the second person.

7. The computer-implemented method of claim 6, wherein assigning the second person as the emergency contact associated with the first person is further based on the organization title data associated with the second person.

8. The computer-implemented method of claim 1, wherein the electronic communication is a text message, a push notification, or an email.

9. The computer-implemented method of claim 1, wherein the emergency response data further comprises responsibility area data associated with each of the first person and the second person.

10. The computer-implemented method of claim 9, wherein assigning the second person as the emergency contact associated with the first person is further based on the responsibility area data associated with each of the first person and the second person.

11. A non-transitory computer-readable storage medium having embodied thereon executable instructions that, when executed, cause a processor to perform a method, the method comprising:
   accessing, by a processor, emergency response data concerning an organization, the emergency response data comprising contact list data associated with a first person associated with the organization, work site location data associated with the first person, work site location data associated with a second person associated with the organization, and contact data associated with the second person;
   receiving, by the processor from a second computing device over a communications network, a triggering notification indicating the occurrence of an emergency event at an emergency location;
   determining, by the processor based on the emergency response data, that the work site location associated with the first person is within a predetermined geographical area that includes the emergency location;
   assigning, by the processor, the second person as an emergency contact associated with the first person based on the work site location data associated with the second person, the responsibility area data associated with the second person, and the responsibility area data associated with the first person; and
   transmitting, by the processor over the communications network to one or more communication devices associated with one or more persons identified in the contact list data associated with the first person, an electronic communication indicating the occurrence of the emergency event, the electronic communication identifying the emergency location and the second person assigned as the emergency contact and comprising the contact data associated with the second person.

12. The non-transitory computer-readable storage medium of claim 11, wherein the method further comprises transmitting, by the processor, the electronic communication over the communications network to a communication device associated with the first person.

13. The non-transitory computer-readable storage medium of claim 11, wherein the method further comprises transmitting, by the processor, the electronic communication over the communications network to a communication device associated with the second person.

14. The non-transitory computer-readable storage medium of claim 11, wherein the emergency response data further comprises alternative work site data identifying a location to which the first person is assigned to travel in response to the occurrence of the emergency event.

15. The non-transitory computer-readable storage medium of claim 14, wherein the electronic communication further comprises the alternative work site data.

16. The non-transitory computer-readable storage medium of claim 11, wherein the emergency response data further comprises organization title data associated with the second person.

17. The non-transitory computer-readable storage medium of claim 16, wherein assigning the second person as the emergency contact associated with the first person is further based on the organization title data associated with the second person.

18. The non-transitory computer-readable storage medium of claim 11, wherein the electronic communication is a text message, a push notification, or an email.

19. The non-transitory computer-readable storage medium of claim 11, wherein the emergency response data further comprises responsibility area data associated with each of the first person and the second person.

20. The non-transitory computer-readable storage medium of claim 19, wherein assigning the second person as the emergency contact associated with the first person is further based on the responsibility area data associated with each of the first person and the second person.

* * * * *